Jan. 25, 1966    R. F. DALRYMPLE, JR    3,231,269
COMBINED SEE-SAW AND WATER SPRAYER
Filed May 5, 1964
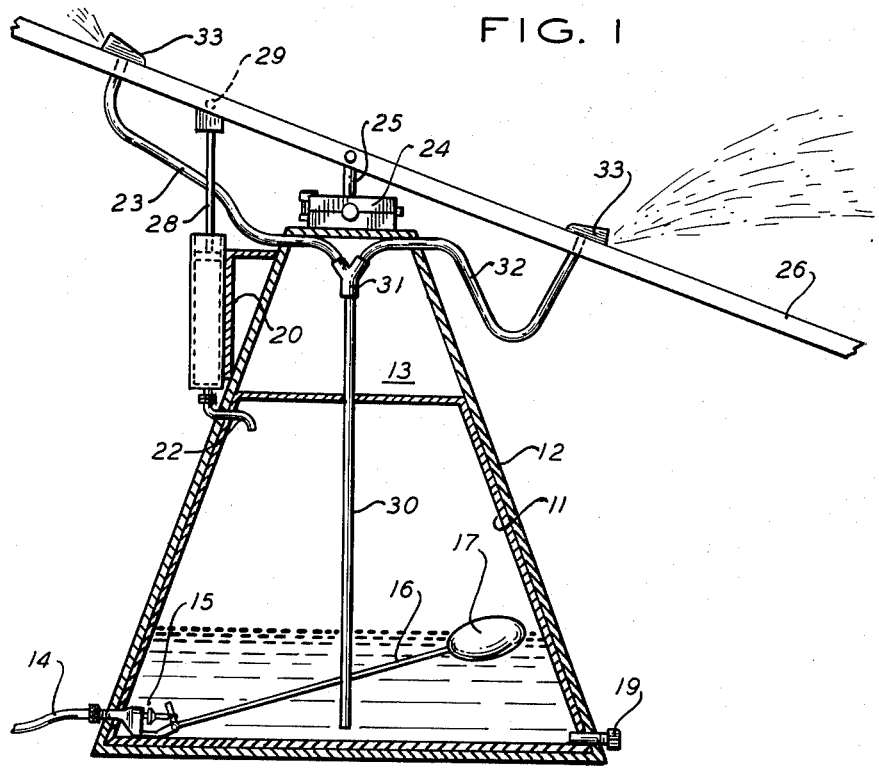
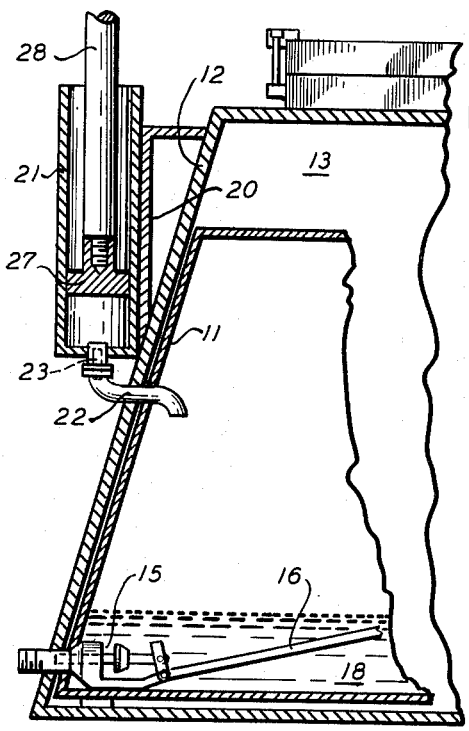
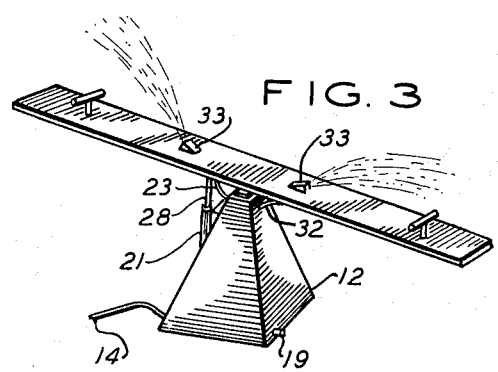
INVENTOR.
ROY F. DALRYMPLE, JR
BY Norman N. Popper
ATTORNEY

United States Patent Office 3,231,269
Patented Jan. 25, 1966

3,231,269
COMBINED SEE-SAW AND WATER SPRAYER
Roy F. Dalrymple, Jr., Church Road, R.D. 1,
Upper Black Eddy, Pa.
Filed May 5, 1964, Ser. No. 364,934
3 Claims. (Cl. 272—54)

My invention relates to see-saws, and particularly to see-saws having shower attachments.

It is an otbject of my invention to provide a see-saw with automatic shower pumping apparatus, regulated at least in part by the reciprocation of the see-saw.

It is another object of my invention to provide an amusement device for children.

Yet another object of my invention is to provide a relatively inexpensive, sturdy, amusement device.

These objects and advantages as well as other objects and advantages may be attained by the device shown by way of illustration in the drawings in which:

FIGURE 1 is vertical sectional view of the see-saw;
FIGURE 2 is a partial vertical sectional view of the pump and housing; and
FIGURE 3 is a perspective view of the see-saw assemblage.

Referring now to the drawings in detail, the see-saw provides a truncated, pyramidal tank 11. The tank 11 is enclosed in a housing 12. There is a space 13 in the housing 12 above the top of the tank 11. An intake conduit 14 passes through the wall of the tank 11 and through the housing 12, and provides means for introducing water into the tank 11. A float valve 15 is attached to the end of the conduit 14, and is connected to a rod 16, with a float 17 thereon. The float 17 opens and closes the valve 15 depending upon the water level in the tank 11, so that the water 18 in the tank 11 is always maintained at a predetermined optimum level by the float opening the valve 15 when the water-level falls too low, and closing the valve 15 when the water-level rises to the predetermined level. A drain plug 19 connected through the housing and through the wall of the tank 11 enables the tank 11 to be drained.

A bracket 20 is provided on the outside of the housing 12, and a pump 21 is mounted on the bracket 20. The air under pressure generated by the pump 21 is conducted to the inside of the tank by a conduit 22, passing through the wall of the housing 12 and the wall of the tank 11. A check valve 23 in the conduit 22 prevents the air under pressure in the tank 11 from escaping back into the pump 21.

Mounted on top of the housing 12 is a support 24 to which a pivot 25 is attached. The pivot 25 is attached to a plank or lever 26, which can reciprocate thereon. The ends of the lever 26 define seats for riders of the see-saw. A piston 27 in the pump 15, is connected to a rod 28 which is attached to a pivot 29 mounted on the plank 26. The reciprocation of the plank 26, will operate the pump 15 and maintain pressure in the tank 11.

A rigid discharge conduit 30 extends into the space 13 from inside the tank 11, where it reaches toward the bottom to pick up any water in the tank and conduct it out by reason of the air pressure in the tank 11. The upper end of the discharge conduit 30 has a Y-shaped connector 31, which is connected to a pair of flexible tubes 32, 32. A pair of spray outlets or nozzles 33, 33 are connected to the top of the plank 26, and the outlets are connected to the ends of the flexible tubes 32, 32 which have been passed through the housing 12. The nozzles 33 are directed toward the outer end of the lever 26.

When the see-saw is in operation and reciprocated by children riding thereon, the pressure generated in the tank 11 will be sufficient to provide a continuous spray in both directions, toward each child so riding. The float 17 will keep a constant supply of water in the tank 11.

The see-saw needs no permanent base. The weight of the water in the tank, in cooperation with the pyramical base, will be sufficient to provide a stabilized fulcrum for the plank 26. The float need only be set to maintain the proper water level.

In use, the distance that the spray will extend will depend upon the pressure generated in the tank by the pump. The distance will also depend upon the up or down position of the see-saw. Careful adjustment of position by the child on the see-saw, or rapidity of reciprocation, or slowness of reciprocation may produce an almost continuous shower upon the opposite rider while skillful reciprocation at just the right speed, with periodic surges, may produce little wetting for one rider. On the other hand, on a hot day, when a shower is refreshing, the skillful timing of one rider may enable almost complete monopolization of the spray. The achievement of either of these results is productive of much amusement and exercise for the riders.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed is:
1. A see-saw comprising
 (a) a tank,
 (b) a housing for the tank,
 (c) a pivotally mounted lever on the tank,
 (d) opposite end portions on the lever defining seats,
 (e) an air pump operably connected to the lever,
 (f) the air output of the pump connected to the tank,
 (g) a conduit extending from the bottom of the tank to the outside of the tank,
 (h) spray-nozzles mounted on opposite sides of the point of pivotal mounting and each directed to discharge toward an end of the lever,
 (i) a flexible conduit connected to the end of the conduit outside of the tank and to each of the spray nozzles,
 (j) a means for introducing water into the tank,
 (k) a float valve to cut off the water at a predetermined level.

2. A see-saw comprising:
 (a) a tank,
 (b) a housing for the tank,
 (c) a pivotally mounted lever on the tank,
 (d) opposite end portions on the lever defining seats,
 (e) an air pump operably connected to the lever,
 (f) the air output of the pump connected to the tank,
 (g) a conduit extending from the bottom of the tank to the outside of the tank,
 (h) spray-nozzles mounted on opposite sides of the point of pivotal mounting and each directed to discharge toward an end of the lever,
 (i) a flexible conduit connected to the end of the conduit outside of the tank and to each of the spray nozzles,
 (j) a means for introducing water into the tank,
 (k) a float valve to cut off the water at a predetermined level,
 (l) the predetermined level established at a point sufficient to provide a weight of fluid in the tank to prevent overbalancing and provide stability during use of the see-saw.

3. A see-saw comprising:
(a) a tank,
(b) a lever pivotally mounted on the tank,
(c) a water connection for the tank,
(d) means for regulating the quantity of water in the tank sufficient to stabilize the tank during operation of the see-saw,
(e) nozzles on the see-saw connected to the tank for discharging water from the tank onto the ends of the see-saw,
(f) a pump operably connected to the tank and to the lever to maintain air pressure in the tank sufficient to expel the water from the tank through the nozzles.

References Cited by the Examiner
UNITED STATES PATENTS
2,903,263    9/1959    Ross _____ 272—54

RICHARD C. PINKHAM, *Primary Examiner.*

FREDERIC B. LEONARD, *Assistant Examiner.*